United States Patent [19]

Matsunaga

[11] Patent Number: 5,429,660
[45] Date of Patent: Jul. 4, 1995

[54] METHOD FOR THE RECOVERY OF GOLD VALUE

[75] Inventor: Hideyuki Matsunaga, Sendai, Japan

[73] Assignee: Japan as represented by Director General of Agency of Industrial Science and Technology, Japan

[21] Appl. No.: 307,062

[22] Filed: Sep. 16, 1994

[30] Foreign Application Priority Data

Oct. 1, 1993 [JP] Japan .................... 5-269674

[51] Int. Cl.$^6$ .............................. C22B 3/42
[52] U.S. Cl. ............................ 75/722; 423/24
[58] Field of Search .................. 75/722; 423/24

[56] References Cited

U.S. PATENT DOCUMENTS 4,894,407  1/1990  Miller et al. .................... 423/24
5,340,380  8/1994  Virnig ............................ 423/24

*Primary Examiner*—Melvyn J. Andrews
*Attorney, Agent, or Firm*—Wenderoth, Lind & Ponack

[57] ABSTRACT

An efficient method is proposed for the recovery of gold value contained in an aqueous solution even in a very low concentration of the ppb level. Namely, an aqueous acidic solution containing gold value in the form of complex gold anions, e.g., chloro complex anions of gold, is contacted with a solid ion exchanger which is prepared by the adsorption of a 2-hydroxyethyl tri($C_{8-12}$)alkyl ammonium halide on porous resin beads of a polymer of methacrylic acid ester so that the complex gold anions are adsorbed by the ion exchange reaction to form ion pairs with the quaternary ammonium cations. The thus adsorbed complex gold anions coupled with the quaternary ammonium cations can be eluted out of the adsorbent with an organic solvent such as alcohols and ketones in a quantitative yield of recovery.

8 Claims, 2 Drawing Sheets

METHOD FOR THE RECOVERY OF GOLD VALUE

BACKGROUND OF THE INVENTION

The present invention relates to a method for the recovery of gold value from an aqueous solution. More particularly, the invention relates to a method for the recovery of gold value from an aqueous solution by using a specific solid ion-exchange adsorbent which efficiently adsorbs the gold value contained in an aqueous solution in the form of complex anions of gold even when the concentration thereof is very low.

It may be too much to say that, in addition to the traditional uses as ornamental or decorative articles, gold is widely used in various industries as a wiring material of electronic circuits in electronic industries or as a catalytically active ingredient in certain catalysts in chemical industries so that the demand for gold is rapidly increasing year by year. In view of the geologically very limited occurrence of gold as a natural resource, accordingly, it is or will be an indispensable technology to recover the gold value from various industrial waste materials. In particular, it is sometimes the case that the content of gold in certain waste materials coming out of the electronic industries is higher than the content in gold-containing ores occurring in nature so that it is an urgent problem under social needs to establish a technology for the recovery of the gold value from such waste materials. The aqueous wastes discharged from refineries of gold or depleted electrolyte solutions discharged from gold-plating plants always contain gold value but they are mostly discarded as such because of the extremely low content of gold therein requiring a great cost for the recovery of the gold value. It is eagerly desired therefore to develop and establish an efficient method for the recovery of the gold value contained in such aqueous wastes in an extremely low concentration from the standpoint of material recycling for the reservation of resorces.

As is well known, metallic gold can be dissolved in aqua regia to form an aqueous solution mainly in the form of chloro complex anions of gold while the aqueous wastes discharged from gold-plating plants using the cyanide-based electrolytic plating bath contain the gold value in the form of cyano complex anions of gold. Conventional processes for the recovery of the complex gold ions in such an aqueous solution include the methods of solvent extraction and ion exchange. The former method of solvent extraction using an organic solvent, however, is not always suitable for the recovery of the gold value when the concentration thereof in the waste aqueous solution is extremely low. The latter method of ion exchange using an ion exchange resin has a difficulty in respect of regeneration of the ion exchange resin. In order to solve these problems, Japanese Patent Publication 62-61535 and Japanese Patent Kokai 62-275024 propose a method for the recovery of complex anions of gold in a very low concentration by using a solid ion exchange adsorbent prepared by the adsorption of a high-molecular amine such as trioctyl amine on a porous polymer of a methacrylic acid ester or a quaternary ammonium salt such as methyl trioctyl ammonium chloride on a porous resin of an acrylic polymer as a resinous carrier. Although these carrier-supported solid ion exchange adsorbents can adsorb the complex gold anions, the lower limit of the concentration of the gold ions in an aqueous solution, from which the complex gold ions can be efficiently adsorbed on the adsorbent, is about 0.1 ppm by weight so that the method is not suitable for the recovery of the gold value from the wastes coming from the last stage of the refining process of gold or the aqueous wastes coming out of a gold-plating process in which the concentration of the gold value is sometimes so low as in the order of ppb by weight.

SUMMARY OF THE INVENTION

The present invention accordingly has an object to provide a novel method for the recovery of gold value from an aqueous solution containing gold in the form of complex anions in an extremely low concentration, for example, in the level of ppb by weight by the adsorption of the complex gold anions on to a specific solid ion exchange adsorbent followed by desorption of the adsorbed gold anions therefrom.

Thus, the method of the present invention for the recovery of gold value from an aqueous solution containing gold in the form of complex anions of gold comprises the steps of:

(a) bringing an acidic aqueous solution containing complex anions of gold into contact with a solid ion exchanger which is a quaternary ammonium salt represented by the general formula $$[R_3N^+CH_2CH_2OH]X^-, \quad (I)$$

in which each R is, independently from the others, an alkyl group having 8 to 12 carbon atoms and X is an atom of halogen, supported on a porous solid or, preferably, a porous synthetic resin as a carrier to effect adsorption of the complex anions of gold by ion exchange on to the solid ion exchanger forming ion pairs of the quaternary ammonium cations and the complex anions of gold;

(b) separating the solid ion exchanger having the ion pairs of the quaternary ammonium cations and the complex anions of gold from the aqueous solution; and (c) bringing the solid ion exchanger into contact with an organic solvent so as to dissolve the ion pairs of the quaternary ammonium cations and the complex anions of gold out of the porous solid.

DETAILED DESCRIPTION OF THE PREFERRED EMBODIMENTS

Figure 1:
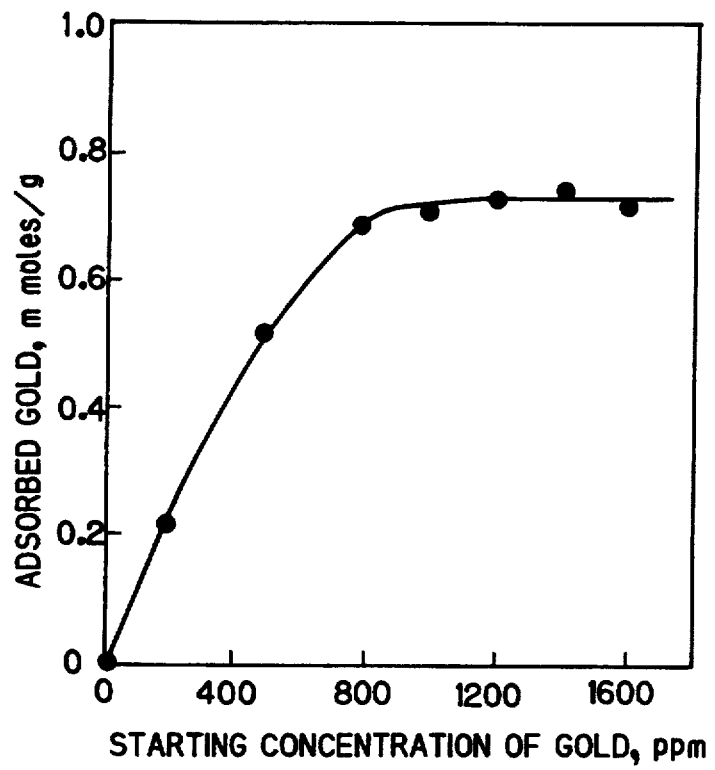
FIG. 1 is a graph showing the amount of gold adsorption as a function of the initial concentration of the complex gold anions in the starting aqueous solution.

As is described above, the scope of the inventive method for the recovery of gold value from an aqueous solution containing gold in the form of complex anions consists in the use of a specific solid ion exchanger which is a specific quaternary ammonium salt supported on a porous solid as a carrier. The solid ion exchanger exhibits very high adsorptive power to the complex gold anions by anion exchange from an aqueous solution even when the concentration of gold in the aqueous solution is extremely low, for example, in the ppb level. The aqueous solution containing the complex gold anions is preferably acidic, for example, with hydrochloric acid although ion exchange adsorption of the complex gold anions can take place even from a neutral or weakly alkaline aqueous solution when the aqueous solution contains chlorine ions Cl⁻ in a relatively high concentration.

The quaternary ammonium salt to be supported on a porous synthetic resin as a carrier to form a solid ion exchanger is a 2-hydroxyethyl trialkyl ammonium halide represented by the general formula

$$[R_3N^+CH_2CH_2OH]X^-, \qquad (I)$$

in which each R is, independently from the others, an alkyl group having 8 to 12 carbon atoms and X is an atom of halogen which is preferably chlorine or bromine. Examples of the quaternary ammonium salts suitable for use in the inventive method include 2-hydroxyethyl trioctyl ammonium chloride and bromide, 2-hydroxyethyl tridecyl ammonium chloride and bromide, 2-hydroxyethyl tridodecyl ammonium chloride and bromide and the like though not particularly limitative thereto.

The porous solid as a carrier, which is preferably a porous synthetic resin, to support the above mentioned quaternary ammonium salt by adsorption is not particularly limitative but porous polymeric resins of methacrylic acid esters such as methyl methacrylate in the form of fine beads are preferred although conventional porous resins such as crosslinked polystyrene resins can be used.

The solid ion exchanger used in the inventive method can be prepared in the following manner. Thus, the quaternary ammonium salt is dissolved in an organic solvent having a relatively low boiling point such as ethyl alcohol, petroleum ether and the like to give a solution in which the porous polymeric resin of a methacrylic acid ester in the form of beads is immersed to be impregnated therewith followed by the removal of the organic solvent by evaporation as is taught by J. R. Parrish in Analytical Chemistry, volume 49, page 1189 (1977). The amount of the quaternary ammonium salt in the solid ion exchanger prepared by this method can be as large as 2 to 3 m moles per g of the resin to exhibit an ion exchange capacity of about 1 m mole/g. Alternatively, an ethyl alcohol solution of the quaternary ammonium salt is passed through a column filled with beads of the porous polymeric resin of a methacrylic acid ester to effect adsorption of the quaternary ammonium salt on to the resin beads followed by washing of the resin bed with diluted hydrochloric acid. This latter method is more convenient and efficient than the former method although the solid ion exchanger obtained by this latter method has a somewhat decreased ion exchange capacity as compared with that obtained by the former method. At any rate, the solid ion exchangers obtained by these methods exhibit very strong adsorptive power to the complex anions of gold as compared with conventional resins impregnated with a quaternary ammonium salt so that complex anions of gold contained in an aqueous solution can be completely adsorbed even when the concentration thereof in the solution is so low as in the ppb level.

When an aqueous solution, which is acidified with an inorganic acid such as hydrochloric acid in an acidity of at least 0.5 moles/liter, containing the complex anions of gold or, preferably, chloro complex anions of gold is brought into contact with the above described solid ion exchanger, namely, the complex anions of gold can be readily adsorbed on to the solid ion exchanger by the ion exchange reaction with the halogen anions of the quaternary ammonium salt to be coupled with the quaternary ammonium cations forming hydrophobic ion pairs hardly soluble in water in the resinous phase. When the ion exchanger bearing the ion pairs of the quaternary ammonium cations and the complex anions of gold is brought into contact with a suitable organic solvent, the ion pairs can be easily leached out of the resinous phase to give a solution of gold value in the form of the ion pairs. This behavior of adsorption and desorption of the complex anions of gold on and from the solid ion exchanger is very unique and differs from the behavior of ions in the ion exchange reaction with an ordinary ion exchange resin. Examples of the organic solvent suitable for the leaching or desorption treatment of the ion pairs include alcoholic solvents and ketone solvents such as, preferably, methyl alcohol, ethyl alcohol, acetone, methyl isobutyl ketone and the like. In this way, the quaternary ammonium salt in the adsorbed state on the porous adsorbent resin is almost completely dissolved out in the form of the ion pairs into the organic solvent so that the porous adsorbent resin is regenerated into a fresh condition and can be re-used to freshly adsorb the quaternary ammonium salt. The gold value contained in the thus obtained solution in the form of the ion pairs can be readily recovered by a known method. For example, the ion pairs are subjected to a conventional reduction treatment using, for example, zinc dust to precipitate gold with concurrent regeneration of the quaternary ammonium salt.

The type of the complex anions of gold is not particularly limitative and any of complex anions of gold can be adsorbed on to the solid ion exchanger by anton exchange although the inventive method is applied most efficiently to chloro complex anions of gold. Namely, metallic gold contained in waste materials is dissolved using aqua regia to be converted into chloro complex anions of gold in an aqueous solution which is subjected to the recovery of gold according to the inventive method.

The adsorption selectivity of the solid ion exchanger used in the inventive method for the complex gold anion as compared with that for the complex anions of other noble metals is greatly improved over the ion exchange adsorbents disclosed in Japanese Patent Kokai 62-275024. Needless to say, metals forming no chloro complex anions, e.g., aluminum and copper, cannot be adsorbed from an aqueous solution containing the ions thereof on to the ion exchange adsorbent so that their separation from gold is complete.

In the following, the method of the present invention is described in more detail by way of examples although the scope of the invention is never limited thereby in any way.

EXAMPLE 1

A solid ion exchanger was prepared in the following manner. Thus, 20 g of a polymeric resin of a methyl methacrylate in the form of porous beads prepared by a known method having a particle size distribution of 60 to 100 mesh fineness were added to a solution prepared by dissolving 9.56 g of 2-hydroxyethyl trioctyl ammonium bromide in 150 ml of ethyl alcohol and, after standing for 30 minutes, the blend was subjected to evaporation of ethyl alcohol to dryness under reduced pressure by using a rotary evaporator to give dried resin beads supporting the quaternary ammonium salt.

The amount of 2-hydroxyethyl trioctyl ammonium bromide contained in 1 g of the thus obtained solid ion exchanger was 0.32 g and the theoretical ion exchange capacity of the ion exchanger was 0.67 m mole/g for monovalent anions.

A 100 mg portion of the above prepared solid ion exchanger was added to 20 ml of 1.2 moles/liter hydrochloric acid containing chloro complex anions of gold in a varied concentration of 200 to 1600 ppm by weight calculated as gold. These feed solutions were prepared by dissolving metallic gold of 99.9% purity in aqua regia followed by evaporating the acids to dryness and dissolving the evaporation residue in 1.2 moles/liter hydrochloric acid to give a master solution containing 5000 ppm by weight of gold which was diluted with 1.2 moles/liter hydrochloric acid to have the respective concentrations. The solution with admixture of the solid ion exchanger was shaken for 2 hours at room temperature followed by the quantitative analysis of the supernatant for the content of the chloro complex anions of gold. The results are shown in FIG. 1 of the accompanying drawing in which the ordinate is for the amount of the adsorbed complex gold anions in m moles per g of the ion exchanger as a function of the initial concentration of the complex gold anions in the sample solutions taken as the abscissa. As is understood from this graph, the adsorbed amount of the complex gold anions levels off as the initial concentration thereof is increased corresponding to the ion exchange capacity of the ion exchanger which is about 0.71 m mole per g of the ion exchanger from these experimental data in good coincidence with the theoretical ion exchange capacity of 0.67 m moles/g mentioned above.

EXAMPLE 2

Figure 2:
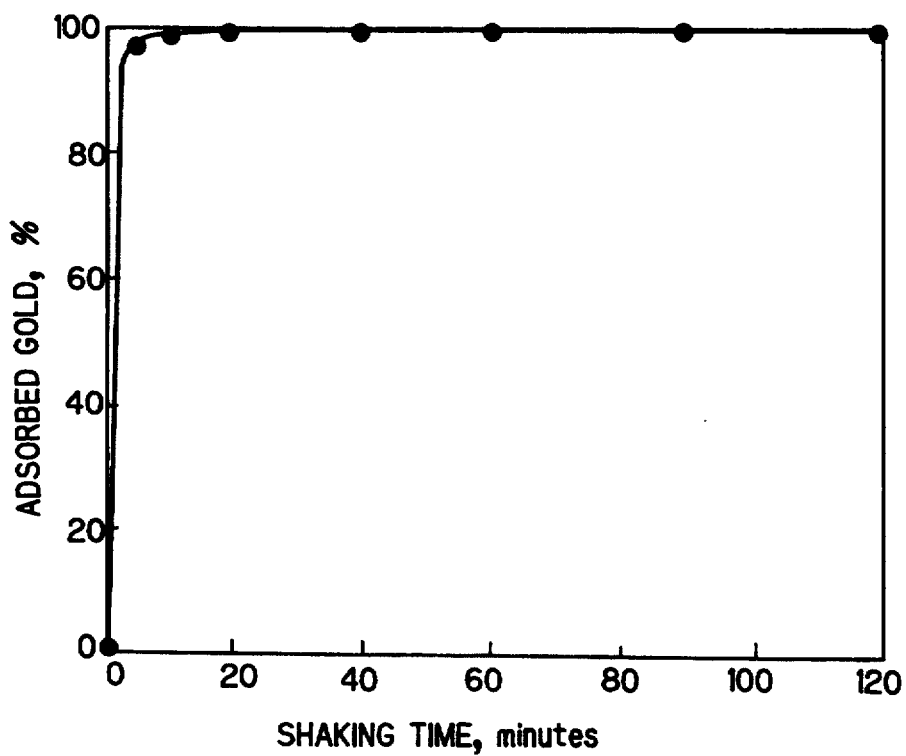
FIG. 2 is a graph showing the percentage of the adsorbed complex gold anions as a function of the shaking time of the aqueous solution containing the solid ion exchanger.

With an object to determine the velocity of ion exchange adsorption, a 100 mg portion of the solid ion exchanger prepared in Example 1 was added to 20 ml of a 1.2 moles/liter hydrochloric acid containing chloro complex anions of gold in a concentration of 10 ppm by weight calculated as gold and the solution was shaken for a varied length of time up to 120 minutes followed by the determination of the content of the complex gold anions left unadsorbed in the supernatant. The results are shown in FIG. 2 of the accompanying drawing in which the ordinate is for the percentage of the adsorbed amount of the complex gold anions based on the amount contained in the starting solution as a function of the shaking time in the abscissa. As is understood from this graph, the velocity of the ion exchange adsorption of the complex gold anions on to the solid ion exchanger is quite high requiring only 10 to 20 minutes of shaking until establishment of adsorption equilibrium.

EXAMPLE 3

Figure 3:
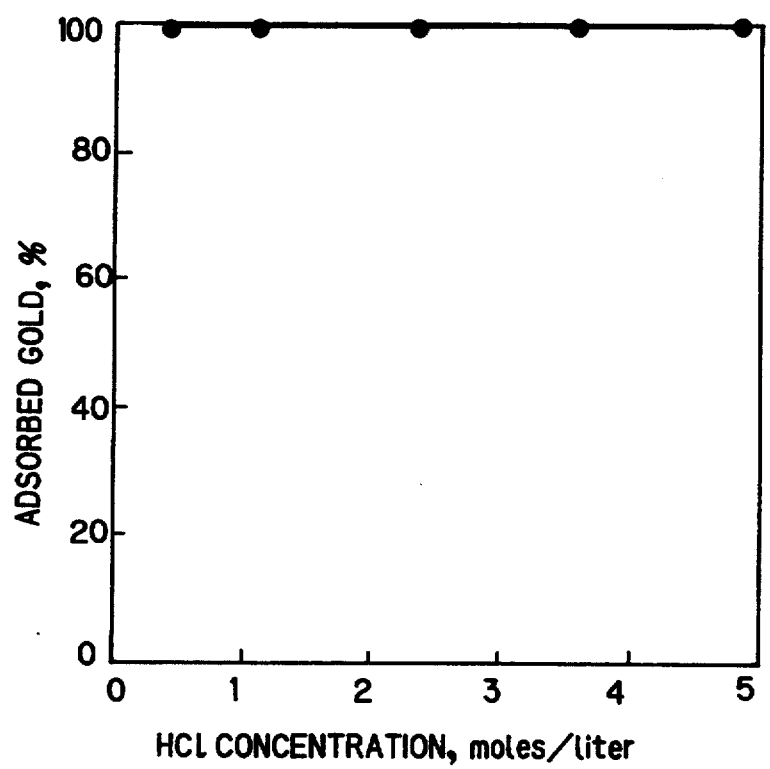
FIG. 3 is a graph showing the percentage of the adsorbed complex gold anions as a function of the acidity in the aqueous solution.

With an object to determine the influence of the acidity of the adsorption medium, adsorption experiments were undertaken by adding a 100 mg portion of the solid ion exchanger prepared in Example 1 to 20 ml of an aqueous solution of hydrochloric acid in a varied concentration up to 4.8 moles/liter containing 10 ppm by weight of chloro complex anions of gold calculated as gold otherwise in substantially the same manner as in Example 1. The results are shown in FIG. 3 of the accompanying drawing, in which the ordinate is for the percentage of the adsorbed amount of the complex gold anions based on the amount contained in the starting solution as a function of the concentration of hydrochloric acid in the adsorption medium as the abscissa. As is understood from this graph, the ion exchange adsorption of the complex gold anions on to the solid ion exchanger is complete when the concentration of hydrochloric acid is at least 0.5 mole/liter.

EXAMPLE 4

A glass column having an inner diameter of 12 mm was filled with a 1 g or about 3 ml portion of a solid ion exchanger, which was prepared in substantially the same manner as in Example 1 excepting replacement of 2-hydroxyethyl trioctyl ammonium bromide with 2-hydroxyethyl tridodecyl ammonium bromide, up to a height of 30 mm to form a resin bed for adsorption. A 0.5 mole/liter aqueous hydrochloric acid containing chloro complex anions of gold in a concentration of 1 ppb by weight calculated as gold was passed through the bed of the ion exchanger at a rate of 1 ml/minute for the total volume of the solution of 30 liters or 70 liters and 2 ml/minute for the total volume of the solution of 100 liters to effect ion exchange adsorption of the complex gold anions on to the ion exchanger resin. The acid solution coming out of the column bottom contained no detectable amount of gold ions in each of the adsorption tests. After washing of the resin bed with diluted hydrochloric acid, elution of the adsorbed complex gold anions was performed by using 10 ml of methylisobutyl ketone as an eluant and the eluate was analyzed for the content of gold to give the results that the concentration of gold in the respective eluates was 2.9 ppm, 7.1 ppm and 10.2 ppm by weight for the tests with 30 liters, 70 liters and 100 liters, respectively, of the feed solution indicating that recovery of the gold value was quantitative even from the feed solution containing the gold value in a very low concentration of 1 ppb by weight.

What is claimed is:

1. A method for the recovery of gold value from an aqueous solution containing gold in the form of complex anions of gold which comprises the steps of:
   (a) bringing an aqueous solution containing complex anions of gold into contact with a solid ion exchanger which is a quaternary ammonium salt represented by the general formula

   $[R_3N^+CH_2CH_2OH]X^-$, in which each R is, independently from the others, an alkyl group having 8 to 12 carbon atoms and X is an atom of halogen, supported on a porous solid as a carrier to effect adsorption of the complex anions of gold by ion exchange on to the solid ion exchanger forming ion pairs of the quaternary ammonium cations and the complex anions of gold;
   (b) separating the solid ion exchanger having the ion pairs of the quaternary ammonium cations and the complex anions of gold from the aqueous solution; and
   (c) bringing the solid ion exchanger into contact with an organic solvent so as to dissolve the ion pairs of the quaternary ammonium cations and the complex anions of gold out of the porous solid.

2. The method for the recovery of gold value from an aqueous solution containing gold in the form of complex anions of gold as claimed in claim 1 in which the halogen denoted by X is chlorine or bromine.

3. The method for the recovery of gold value from an aqueous solution containing gold in the form of complex anions of gold as claimed in claim 2 in which the quaternary ammonium salt is selected from the group consisting of 2-hydroxyethyl trioctyl ammonium chloride and bromide, 2-hydroxyethyl tridecyl ammonium chloride and bromide and 2-hydroxyethyl tridodecyl ammonium chloride and bromide.

4. The method for the recovery of gold value from an aqueous solution containing gold in the form of complex anions of gold as claimed in claim 1 in which the porous solid is a porous synthetic resin in the form of beads.

5. The method for the recovery of gold value from an aqueous solution containing gold in the form of complex anions of gold as claimed in claim 4 in which the synthetic resin is a polymer of a methacrylic acid ester.

6. The method for the recovery of gold value from an aqueous solution containing gold in the form of complex anions of gold as claimed in claim 1 in which the aqueous solution containing gold in the form of complex anions is acidic containing hydrochloric acid.

7. The method for the recovery of gold value from an aqueous solution containing gold in the form of complex anions of gold as claimed in claim 6 in which the concentration of hydrochloric acid in the acidic aqueous solution containing complex anions of gold is at least 0.5 mole/liter.

8. The method for the recovery of gold value from an aqueous solution containing gold in the form of complex anions of gold as claimed in claim 1 in which the organic solvent used in step (c) is an alcohol or ketone.

* * * * *